US012266328B2

(12) United States Patent
Härtl

(10) Patent No.: US 12,266,328 B2
(45) Date of Patent: Apr. 1, 2025

(54) INSTRUMENT SUPPORT

(71) Applicant: Robert Kühnl, Baiersdorf (DE)

(72) Inventor: Andreas Härtl, Baiersdorf (DE)

(73) Assignee: Robert Kühnl, Baiersdorf (DE)

( * ) Notice: Subject to any disclaimer, the term of this patent is extended or adjusted under 35 U.S.C. 154(b) by 244 days.

(21) Appl. No.: 17/974,908

(22) Filed: Oct. 27, 2022

(65) Prior Publication Data

US 2023/0169942 A1 Jun. 1, 2023

(30) Foreign Application Priority Data

Oct. 29, 2021 (DE) ..................... 10 2021 128 283.7

(51) Int. Cl.
*G10G 5/00* (2006.01)
*G10D 3/00* (2020.01)

(52) U.S. Cl.
CPC ............... *G10G 5/005* (2013.01); *G10D 3/00* (2013.01)

(58) Field of Classification Search
CPC ............ G10G 5/005; G10D 3/00; G10D 1/08; G10D 3/18
See application file for complete search history.

(56) References Cited

U.S. PATENT DOCUMENTS 6,252,150 B1 6/2001 Johnson
7,205,468 B1 * 4/2007 Johnson ................ G10G 5/005
84/421

FOREIGN PATENT DOCUMENTS

DE 19757272 A1 6/1999
DE 20021500 U1 4/2001
DE 20300431 U1 4/2003
DE 102007008482 A1 9/2008
DE 102014112180 B3 4/2015
DE 102018131118 A1 6/2020

* cited by examiner

*Primary Examiner* — Kimberly R Lockett
(74) *Attorney, Agent, or Firm* — Hudak, Shunk & Farine Co. LPA

(57) ABSTRACT

An instrument support for a guitar including a bridge for resting on a leg of a person, the bridge lying in an x-z plane, wherein at the opposite ends of the bridge with respect to a direction x a first holder and a second holder are respectively provided for receiving a guitar, the first holder having a first holding member and a second holding member for holding a guitar, the holding members each having a nominal bearing surface with a normal, against which it is intended to bear a guitar, the first member being alignable in such a way that its normal is aligned along the y-direction, the second member being alignable in such a way that its normal is aligned along the z-direction, wherein in that the second member is aligned in such a way that its normal is aligned along the z-direction.

11 Claims, 2 Drawing Sheets

INSTRUMENT SUPPORT

FIELD OF THE INVENTION

The invention relates to an instrument support for a guitar, respectively a guitar support comprising a bridge for resting on a leg of a person, the bridge lying in an x-z plane, wherein at the opposite ends of the bridge with respect to a direction x a first holder and a second holder are respectively provided for receiving the guitar, wherein the first holder comprises a first holding member and a second holding member for holding the guitar, the holding members each having a nominal abutment surface with a normal to which it is intended to abut the guitar, the first holding member being orientable such that its normal is aligned along the y-direction.

By definition, the indications “parallel”, “in” or “against” with reference to a direction are to be understood in such a way that no deviation from the direction is permitted. Indications given as “along” or “against” with reference to a direction allow a deviation of up to 30°. In particular, a deviation in the range between +/−15° to 25°.

BACKGROUND OF THE INVENTION

A support for a stringed instrument such as a bass is already known from DE 10 2014 112 180 B3, which has two holders with holding members. The holding members have nominal contact surfaces with normals along the x- and the y-direction, which are applied and clamped on both sides to a bead at the bottom edge of the frame against the frame and the bottom.

In addition, a guitar support is known from U.S. Pat. No. 6,252,150 B1. The guitar support has two holders, each with two holding members whose normals point to the nominal contact surfaces along the y-direction. The holding members can be placed against the frame of the guitar body.

SUMMARY OF THE INVENTION

The invention is based on the task of designing and arranging an instrument support in such a way that the guitar is secured against tilting.

According to the invention, the task is solved by aligning the second holding member in such a way that its normal is aligned along the z-direction. The underside of the instrument support can be placed against the leg of a person while the guitar is being played. Extending upwards from the instrument support, i.e. along the y-direction, are the two holders which are attached to the long sides of the bridge. The first holder has two holding members, each with a nominal contact surface. The target contact surface is the surface against which the guitar rests with parts of its body during playing. Accordingly, it is intended to place the guitar with its frame wall on the first holding member or its target contact surface during playing and also to place the guitar with its back wall against the second holding members or its target contact surface. The first holding member can be aligned via the swivel joint. During playing, the guitar is accordingly supported by its frame from below along the y-direction via the first holding member on the leg of the person. In addition, the guitar back, i.e. the back of the guitar facing the person, is supported from behind on the second holding member along the z-direction so that the guitar cannot tilt about an x-axis.

It can also be advantageous if the normals of the nominal contact surfaces of the first and second holding member can be aligned at right angles to each other. The first holding member or its nominal contact surface can be pivoted along the x-z plane and the second can be pivoted along the y-x plane. In addition, the second holding member can be arranged offset in the x-direction relative to the first holding member. As a result of this and the right-angled alignment as well as the possible common position in planes parallel to the y-z plane, both the frame wall and the bottom of the guitar can be supported by the corresponding holding member.

Furthermore, it can be advantageous if the first holder has a swivel joint with a swivel axis along the z-axis, wherein the first holding member can be swiveled by means of the swivel joint, in particular can be swiveled independently of the second holding member. The first holding member can also be pivotable independently of the third holding member. In this way, the first holding member and its nominal contact surface can be adapted to the course or alignment of the surface of the frame.

It can also be advantageous if the first holder has a telescopic element by means of which the first and/or the second holding member can be retracted and/or extended translationally with respect to the bridge. The first and/or the second holding member can be retractable and/or extendable along or against the y-direction. This varies the distance between the corresponding holding member and the bridge. In particular, by allowing the holding member to be retractable and extendable, the first holding member can be adjusted to fit the guitar frame and the guitar can be aligned. In particular, the person can align the neck of the guitar steeper or flatter to suit the needs.

It can be advantageously provided that the second holder has a third holding member, the third holding member having a nominal contact surface with a normal, the third holding member being alignable in such a way that its normal is aligned along the y-direction. The frame of the guitar is placed on the nominal contact surface of the third holding member during playing. The third holding member supports the guitar from below.

It is also advantageous if the normals of the nominal contact surfaces of the first and third holding member can be aligned in parallel. The normal of the first and/or third holding member can be pivoted in a plane parallel to the y-z plane. The first and third holding member can be at the same height with respect to the z-axis. This allows the guitar frame wall to be supported by both holding members.

It can be of particular importance for the present invention if the second holder has a pivot bearing with a pivot axis along the z-axis, wherein the third holding member can be pivoted by means of the pivot bearing, in particular can be pivoted independently of the first and/or second holding member. The swivel axes of the swivel joint and the swivel bearing can be parallel to each other. In this way, the third holding member and in particular its nominal contact surface can be adapted to the curved course of the surface of the frame. The holding members can be aligned accordingly by means of the swivel joint and the swivel bearing.

In connection with the design and arrangement according to the invention, it can be advantageous if the first and/or the second and/or the third holding member is designed as a suction cup. The suction cup is pressed against the respective surface of the guitar by the pressure difference or the ambient pressure in the direction of the respective norms and experiences a firm fit on the surface of the guitar. The concave suction cup surface forms the nominal contact surface. The first and third neck elements, which are designed as suction cups, are placed against or sucked into the frame with the concave suction cup surface at the bottom along the y-direction. The second holding member, which is designed as a suction cup, is placed or sucked against the floor with the concave suction cup surface from the rear along the z-direction.

It can also be advantageous if the normal of the first and/or third holding member encloses an angle α of 10° to 20° or 5° to 25° with the y-axis, preferably that the normal can be pivoted in a plane along the x-y plane. The bridge is correspondingly tilted relative to the holding members by the angle α. Thus, the instrument support is ergonomically adapted to the sitting posture of the person, in particular the position of the legs and the upper body.

It can also be advantageous if the normal of the second holding member encloses an angle α of 10° to 20° or 5° to 25° with the z-axis, in particular that the normal can be pivoted in a plane along the y-z plane. This also ensures ergonomic adaptation to the sitting posture.

Furthermore, it can also be an advantage if the swivel axis of the swivel joint and/or the swivel axis of the swivel bearing encloses an angle α of 10° to 20° or 5° to 25° with the z-axis. The swivel axis of the swivel joint and/or the swivel axis of the swivel bearing can each lie in a plane parallel to the y-z plane. In this way, the holding members can be optimally adapted to the frame.

Furthermore, it can be advantageous if the bridge is concavely curved in the x-direction. Due to the associated upward curvature of the underside in the y-direction, the underside of the bridge is ergonomically adapted to the shape of the leg or thigh. In this case, the x-axis runs curved so that the bridge lies in the x-z plane. Otherwise, the coordinate system remains Cartesian.

BRIEF DESCRIPTION OF THE DRAWINGS

Further advantages and details of the invention are explained in the patent claims and in the description and are shown in the figures. It shows:

The figures show an embodiment of an instrument support 1.

DETAILED DESCRIPTION OF THE INVENTION

Figure 1:
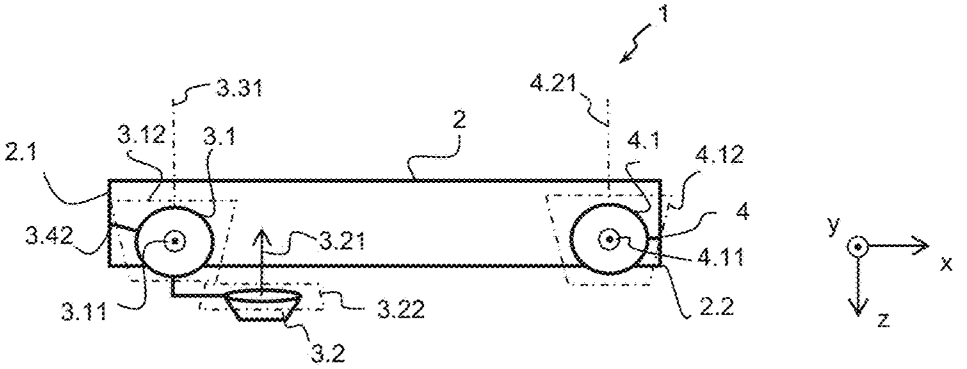
FIG. 1 shows an instrument support looking against the y-direction.

According to FIG. 1, the instrument support 1 has a bridge 2 that lies in the x-z plane, as illustrated by the coordinate system on the right edge of FIG. 1. The bridge 2 is placed with its concave bottom side on the leg of a person when playing a guitar. The bridge 2 has two ends 2.1, 2.2, which delimit the longitudinal sides, and extends from the first end 2.1 in the x-direction longitudinally to the second end 2.2. A first holder 3 is attached to the first end 2.1 and a second holder 4 is attached to the second end 2.2.

The first holder 3 extends upwards along the y-direction. A first holding member 3.1 is provided on the holder. The first holding member 3.1 has a nominal contact surface 3.12 with a normal 3.11. The normal 3.11 points along the y-direction. In this case, the normal 3.11 is inclined by approx. 15° relative to the y-direction. The nominal contact surface 3.12 is the surface that supports the guitar during playing in such a way that the guitar can be positioned as intended. In this case, the frame of the guitar rests completely on the nominal contact surface 3.12.

In addition, a second holding member 3.2 is attached to the first holder 3. The second holding member 3.2 is provided above the first holding member 3.1 in the y-direction. In addition, the second holding member 3.2 is offset in the z-direction. Furthermore, the second holding member 3.2 is arranged laterally offset in the x-direction relative to the first holding member 3.1. In this way, a space is created in which the guitar or part of the body of the guitar is placed when played. The second holding member 3.2 has a nominal contact surface 3.22 with a normal 3.21 that is aligned along the z-direction. The direction of the normal 3.21 is oriented opposite to the z-direction. In this case, the normal 3.21 is inclined by about 15° relative to the z-direction. The nominal contact surface 3.22 of the second holding member 3.2 is used for contact against a guitar back. The normals 3.11, 3.21 of the first and second holding members 3.1, 3.2 are arranged at right angles to one another, as shown in particular in FIG. 3*a*, since the frame and back of a guitar are also aligned per se at right angles to one another.

The second holder 4 also extends upwards along the y-direction. A third holding member 4.1 is attached to the second holder 4. It also has a nominal contact surface 4.12 with a normal 4.11. The normal 4.11 points along the y-direction. In this case, the normal 4.11 is inclined by approx. 15° relative to the y-direction. It is intended that the nominal contact surface 4.12 of the third holding member 4.1, like that of the first holding member 3.1, rests against the guitar frame wall. Accordingly, the normals 3.11, 4.11 of the first holding member 3.1 and the third holding member 4.1 are aligned parallel to each other in the illustration. This also applies to the nominal contact surfaces 3.12, 4.12, whereby, for the purpose of adapting to the curve shape of the frame, different swivel angles with reference to the respective swivel axis 3.31 and swivel axis 4.21 are possible. The first and third holding members 3.1, 4.1 are arranged at the same height in relation to the z-direction.

The holding members 3.1, 3.2, 4.1 are designed as suction cups. As such, they each fix the guitar in all three spatial directions so that the guitar is also completely fixed with regard to tilting the guitar relative to the instrument support 1.

Figure 2:
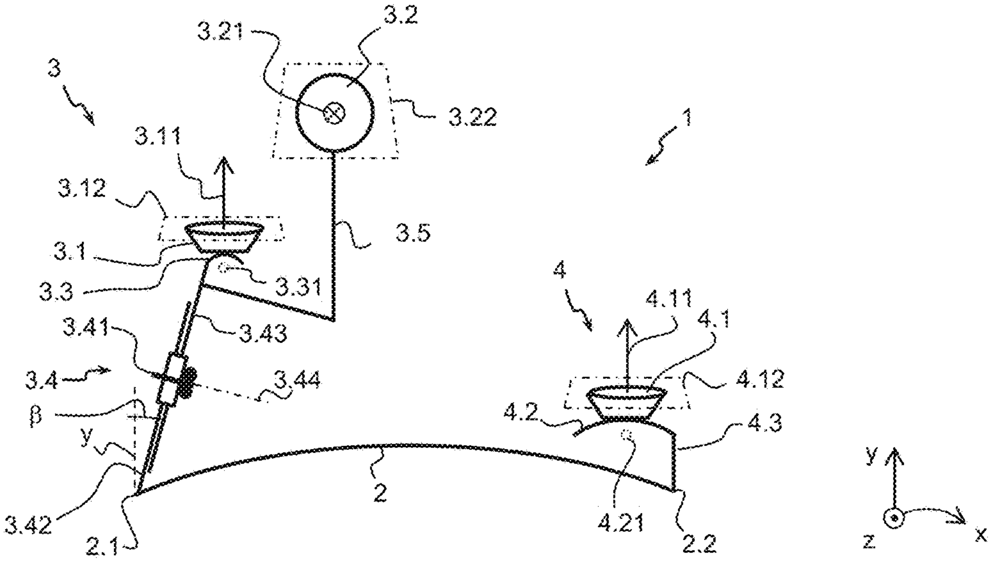
FIG. 2 shows an instrument support looking against the z-direction.

According to FIG. 2, the first holder 3 has a telescopic element 3.4 with a first telescopic rail 3.42 and a second telescopic rail 3.43. The telescopic rails 3.42, 3.43 can be moved relative to each other. In this way, the first and second holding members 3.1, 3.2 can be moved in and out translationally with respect to the bridge 2 along the y-axis. The distance between the first and second holding members 3.1, 3.2 and the bridge 2 is in this respect adjustable and the posture of the guitar, in particular the orientation of the guitar neck, can be adapted to the preferences of the person. The telescopic rails 3.42, 3.43 can be locked with respect to each other by means of a locking means 3.41. The locking device 3.41 is a combination of screw and wing nut. The locking means 3.41 also serves as a swivel bearing 4.2 between the two telescopic slides 3.42, 3.43 with a swivel axis 3.44.

The first telescopic rail 3.42 is attached to the bridge 2. The second telescopic rail 3.43 is fastened to the first telescopic rail 3.42 via the locking means 3.41. The second telescopic rail 3.43 has a swivel joint 3.3. A swivel joint 3.3 is provided at the upper tip of the second telescopic rail 3.43. The swivel joint 3.3 has a swivel axis 3.31 which runs along the z-axis. The first holding member 3.1 is seated on the swivel joint 3.3 and can be swiveled so that it can be adapted to a curved course of a guitar frame wall. A leg 3.5 is also attached to the second telescopic rail 3.42, to the upper tip of which the second holding member 3.2 is attached. The holder 3 and in particular the telescopic element 3.4 with the first telescopic rail 3.42 enclose an angle β of approximately 10° with the y-axis.

The second holder 4 has a base 4.3 which is attached to the bridge 2. A swivel bearing 4.2 with a swivel axis 4.21 is attached to the base 4.3, to which the third holding member 4.1 is attached. The swivel axis 4.21 runs along the z-axis so that the third holding member 4.1 can also be swiveled. The third holding member 4.1 can therefore also be adapted to a curved frame. The swivel axes 3.31, 4.21 of the swivel joint 3.3 and the swivel bearing 4.2 are parallel to each other.

The bridge 2 runs in a concave curve in the x-direction and is curved upwards in the y-direction so that it is ergonomically adapted to the shape of the leg or upper leg. In this case, the x-axis is curved so that the bridge 2 comes to rest in the x-z plane formed in this way. Otherwise, it is an ordinary Cartesian coordinate system as shown, to which, apart from the curvature, no further changes have been made.

Figure 3:
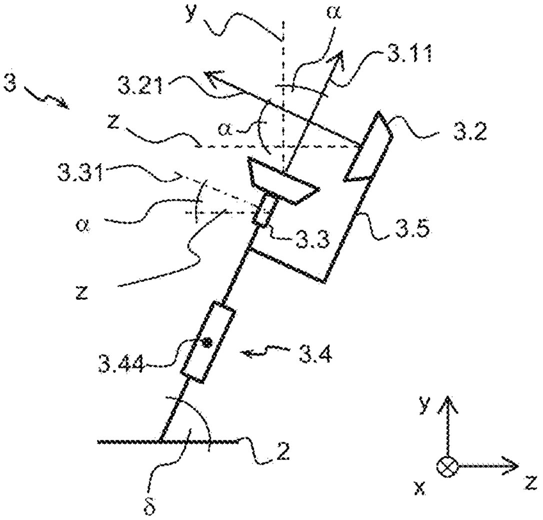
FIG. 3 shows a first end of the instrument support looking in the x-direction.

FIG. 3 shows the first end 2.1 of the bridge 2. At this end 2.1, the first holder 3 with the first and second holding members 3.1, 3.2 is provided. The normal 3.11 of the first holding member 3.1 encloses an angle α of 15° with the y-axis. The telescopic element 3.4 encloses an angle δ with the bridge 2, with δ=90°−α. The normal 3.21 of the second holding member 3.2 encloses the same angle α with the z axis. The normal 3.11 of the first retaining element 3.1 is pivoted via the pivot joint 3.3 in a plane parallel to the x-y plane. As discussed earlier, these normals 3.11, 3.21 are perpendicular. The swivel axis 3.31 of the swivel joint 3.3 likewise includes the angle α of 15° with the z-axis. The swivel axis 3.31 lies in a plane parallel to the y-z plane. It is parallel to the normal 3.21 of the second holding member 3.2.

Figure 4:
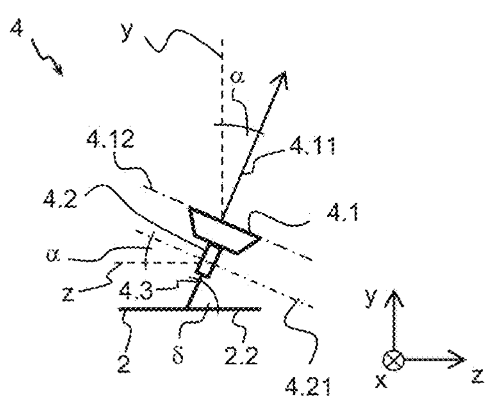
FIG. 4 shows a second end of the instrument support looking in the x-direction.

According to FIG. 4, the normal 4.11 of the third holding member 4.1 also includes the angle α of approximately 15° with the y-axis. The normal 4.11 is also swiveled by means of the swivel bearing 4.2 into a plane parallel to the y-z plane. The normal 4.11 is parallel to the normal 3.11 of the first holding member 3.1. The swivel axis 4.21 of the swivel bearing 4.2 also includes the angle α with the z-axis. The swivel axes 3.31, 4.21 of the swivel joint 3.3 and the swivel bearing 4.2 are parallel. The swivel axis 4.21 lies in a plane parallel to the y-z plane and is parallel to the normal 3.21 of the second holding member 3.2.

Figure 5:
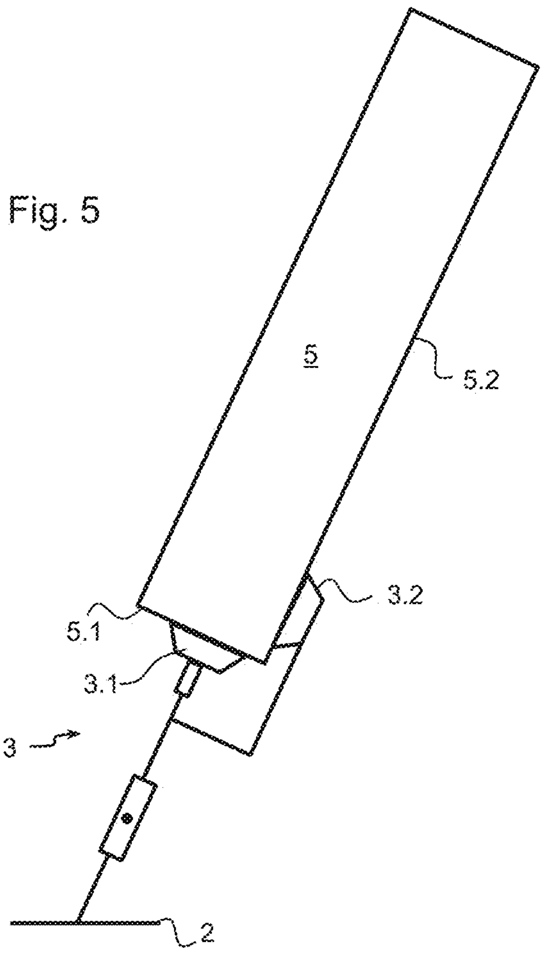
FIG. 5 shows a second end of the instrument support place at a guitar.

According to FIG. 5 a guitar is placed on the first holder 3 wherein a frame wall 5.1 of the guitar 5 is placed on the first holding member 3.1 and a back wall 5.2 of the guitar 5 is placed on the second holding member 3.2.

REFERENCE LIST

1 instrument support
2 bridge
2.1 first end, long side
2.2 second end, long side
3 first holder
3.1 first holding member
3.11 normal
3.12 nominal bearing surface
3.2 second holding member
3.21 normal
3.22 nominal bearing surface
3.3 swivel joint
3.31 swivel axis
3.4 telescopic element
3.41 locking means
3.42 first telescopic rail
3.43 second erste Teleskopschiene
3.44 swivel axis
3.5 leg
4 second holder
4.1 third holding element
4.11 normal
4.12 nominal bearing surface
4.2 pivot bearing
4.21 pivot axis
4.3 base
5 guitar
5.1 frame wall
5.2 back wall

What is claimed is:

1. An instrument support for a guitar, comprising:
a bridge for resting on a leg of a person, the bridge lying in an x-z plane,
wherein at the opposite ends of the bridge with respect to a direction x, a first holder and a second holder are each connected to the bridge for receiving the guitar,
wherein the first holder has a first holding member and a second holding member for holding the guitar, the holding members each having a nominal bearing surface with a normal, wherein the first and second holding members are adapted to bear the guitar,
wherein the first holding member is alignable in such a way that its normal is aligned along a y-direction and adapted to bear a frame wall of the guitar, and
wherein the second holding member is alignable in such a way that its normal is aligned along a z direction and adapted to bear a back wall of the guitar.

2. The instrument support according to claim 1, wherein the normals of the nominal bearing surfaces of the first holding member and the second holding member are alignable at right angles to one another.

3. The instrument support according to claim 1, wherein the first holder has a swivel joint with a swivel axis along the z-axis, it being possible to swivel the first holding member by means of the swivel joint.

4. The instrument support according to claim 1, wherein the first holder has a telescopic element by means of which the first and/or the second holding member is retractable and/or extendable translationally with respect to the bridge.

5. The instrument support according to claim 1, wherein the second holder has a third holding member, the third holding member having a nominal bearing surface with a normal, the third holding member being alignable in such a way that its normal is aligned along the y-direction.

6. The instrument support according to claim 1, wherein the second holder has a pivot bearing with a pivot axis along the z-axis, the third holding member being pivotable by means of the pivot bearing.

7. The instrument support according to claim 1, wherein the first and/or the second and/or the third holding member is designed as a suction cup.

8. The instrument support according to claim 5, wherein the normal of the first and/or of the third holding member encloses an angle α of 10° to 20° with the y-axis, wherein the normal can be pivoted in a plane along the x-y plane.

9. The instrument support according to claim 1, wherein the normal of the second holding member encloses an angle α of 10° to 20° with the z-axis, wherein the normal is pivotable in a plane along the y-z plane.

10. The instrument support according to claim 1, wherein the pivot axis of the pivot joint and/or the pivot axis of the pivot bearing encloses an angle α of 10°-20° with the z-axis.

11. The instrument support according to claim 1, wherein the bridge is concavely curved in the x-direction.

* * * * *